US007022268B2

(12) United States Patent
Primel et al.

(10) Patent No.: US 7,022,268 B2
(45) Date of Patent: Apr. 4, 2006

(54) PROCESS FOR MOULDING A LENS HAVING AN INSERT

(75) Inventors: Odile Primel, Vincennes (FR); Maxime Pillie, Paris (FR); Tony Dantas De Morais, Saint Maur de Fosses (FR); Leanirith Yean, Longjumeau (FR)

(73) Assignee: Essilor International, (FR)

( * ) Notice: Subject to any disclaimer, the term of this patent is extended or adjusted under 35 U.S.C. 154(b) by 426 days.

(21) Appl. No.: 10/217,525

(22) Filed: Aug. 13, 2002

(65) Prior Publication Data

US 2003/0057577 A1 Mar. 27, 2003

(30) Foreign Application Priority Data

Aug. 14, 2001 (FR) .................................. 01 10816

(51) Int. Cl.
*B29D 11/00* (2006.01)

(52) U.S. Cl. ........................ 264/1.32; 264/1.7; 264/2.7

(58) Field of Classification Search ................. 264/1.1, 264/1.32, 1.7, 274, 275, 2.7, 138, 2.5; 359/633
See application file for complete search history.

(56) References Cited

U.S. PATENT DOCUMENTS 3,431,327 A 3/1969 Tsuetaki
3,697,629 A 10/1972 Bronstein
4,689,387 A 8/1987 Kajimoto et al.
4,775,733 A 10/1988 Kanemura et al.
4,873,029 A * 10/1989 Blum ........................ 264/1.32
5,547,618 A 8/1996 Magne
5,886,822 A 3/1999 Spitzer
6,204,974 B1 3/2001 Spitzer

FOREIGN PATENT DOCUMENTS

| | | |
|---|---|---|
| EP | 0 224 123 | 10/1991 |
| EP | 0509190 A2 | 10/1992 |
| EP | 0 605 293 | 9/1997 |
| EP | 0 745 620 | 10/1997 |
| EP | 0 745 621 | 4/1998 |
| EP | 0983838 A2 | 8/2000 |
| WO | WO 95/29941 | 11/1995 |

* cited by examiner

*Primary Examiner*—Mathieu D. Vargot
(74) *Attorney, Agent, or Firm*—Fish & Richardson P.C.

(57) ABSTRACT

A lens has at least one insert (16, 28), which defines an optical path. For manufacturing the lens, the insert is first bonded to an overmould (36). A polymer (44) is then moulded in a mould (42, 36) formed on one of its faces from the overmould. After moulding, the overmould may be preserved and form part of the lens, if necessary after surface grinding. The overmould may also be separated from the lens; in this case, the lens is machined, removing at least part of the inserts. The lens obtained has an insert in a reproducible position, with an entrance or exit surface inducing no optical distortion.

11 Claims, 2 Drawing Sheets

FIG_1
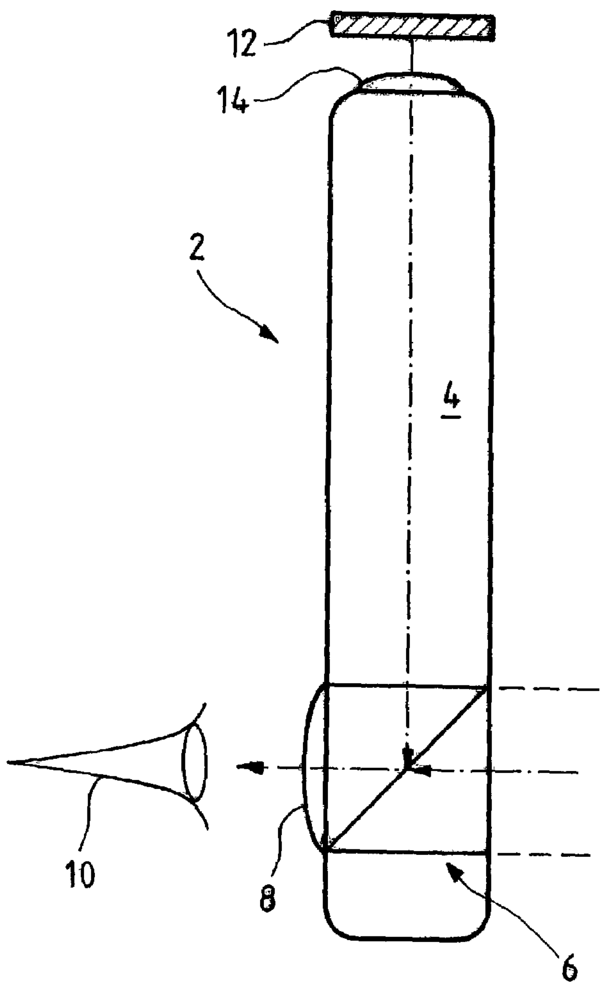
FIG_2
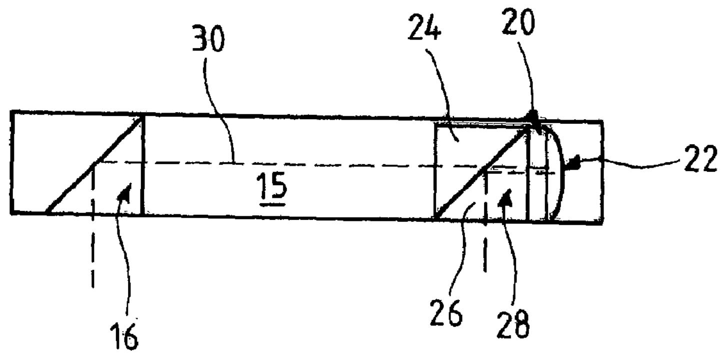

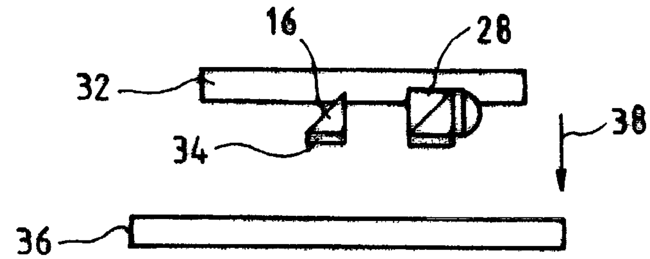
FIG_3
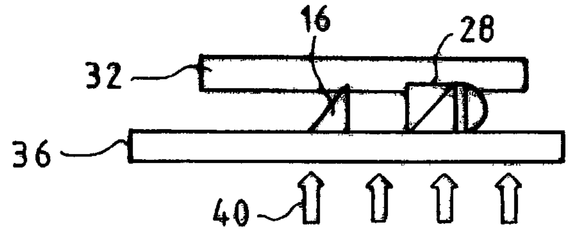
FIG_4
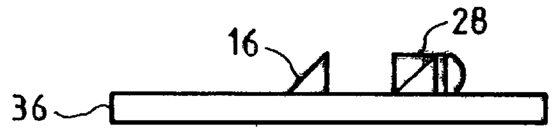
FIG_5
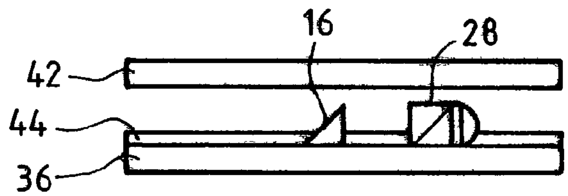
FIG_6
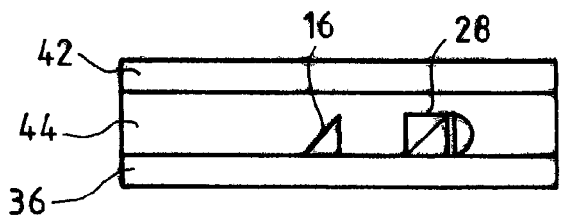
FIG_7
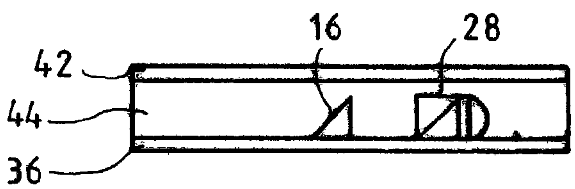
FIG_8
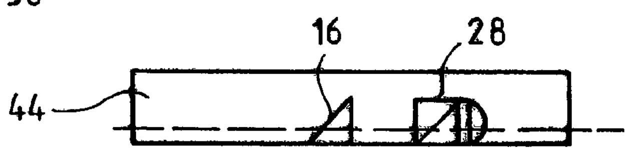
FIG_9
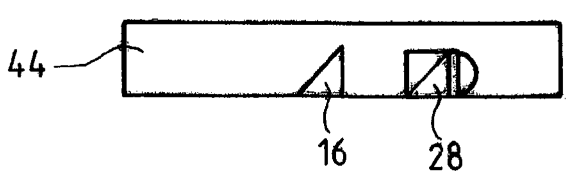
FIG_10

PROCESS FOR MOULDING A LENS HAVING AN INSERT

This application claims priority under 35 U.S.C. 119(a) to French Patent Application Serial No. 01 10 816 filed Aug. 14, 2001.

BACKGROUND OF THE INVENTION

The present invention relates to lenses having inserts defining an optical path, and more specifically to the provision of such inserts in a moulded ophthalmic lens.

Patents U.S. Pat. No. 5,886,822 and U.S. Pat. No. 6,204,974 describe systems of image combinations for eyeglasses or face masks; an image is projected towards the wearer's eye, via an optical path made in the lens; in these patents, as in the present description, the term "lens" refers to the optical system containing the inserts, which system may especially be intended to be mounted in an eyeglass frame or in a face mask. In one embodiment, this optical path is defined by inserts mounted in the thickness of the lens; the inserts proposed in those patents comprise combiners, mirrors, semi-reflective plates, polarizing beam splitter cubes, quarterwave plates, concave reflecting lenses or Mangin mirrors, diffractive lenses and holographic components. It is proposed to mount these inserts in the lens in an injection moulding, or else to machine the inserts and assemble them with the other elements of the lens. To take an example, it is proposed to form the lens from $LaSFN_9$ having a refractive index of 1.85, or to use commercially available products having a refractive index close to that of glass (1.46). Those documents do not give more details about the way in which the inserts may be provided in the lenses.

U.S. Pat. No. 5,547,618 describes a method of moulding ophthalmic lenses; two half-moulds, made of mineral material, are provided. These half-moulds are assembled with an annular closure element. A moulding cavity is thus formed, in which a curable material is placed, for example by injecting it. The curing of the material is carried out, for example, by irradiating it with ultraviolet light. The lens formed is demoulded, after partial or complete curing.

EP-A-983 838 discloses a process for making colored contact lenses with a dazzling appearance. A pigment composition is printed to the surface of a mould. The material forming the lens is then spin-cast in the mold, before being cured. The pigment composition is dissolved wholly or in part into the material during spin-casting.

U.S. Pat. No. 33,431,327 discloses a process for making a contact lens having a metallic insert and an insert having a higher index than the material of the lens. A cutout surface is formed in a blank of material. The metallic insert or weight unit is placed therein. The higher index material is then cast in place, covering the weigh unit. The entire unit is then cured for fusing the two portions into an integral lens unit containing the weight unit. The lens is cut into this cured unit. This documents teaches against the use of adhesives, which may leach out to damage the wearer of the lens.

U.S. Pat. No. 3,967,629 discusses a method of making a contact lens blank. A circular substrate is grinded to form a curved surface. A plastic mold is formed with a surface complemental to that of the substrate and a pair of through passages. The substrate and the mold are then clamped. A curable material is poured into the passages and is cured, so as to form solid fused segments on the substrate. The plastic mold is removed and a curable material is applied to the substrate with its fused segments; the material is cured to form the blank from which the lens may be machined. The process disclosed in this document is adapted to manufacture contact lenses, by molding segments of a curable material onto a substrate.

These three documents relate to contact lenses, and not to spectacles lenses. Such contact lenses are not adapted for receiving inserts which define an optical path within the lens. The inserts referred to in these documents do not create an optical path but rather serve to weight the lens; else they are used for locally changing the refractive index of the lens—in the case of multifocal contact lenses.

EP-A-0 509 190 is directed to the manufacture of a multifocal three component glass-plastic laminated lens. The lens has a front glass layer, a back plastic layer and a segment or button embedded within the back plastic layer. An adhesive interlayer is provided between the glass layer on one hand and the back plastic layer with its embedded button on the other hand. The back plastic layer and its embedded button are formed as follows. The segment is preformed and placed in a mold. This is not the preferred technique, and there is no indication in this document of the way the segment is maintained in the mold. The monomer of the back plastic layer is injected into the mold and cured. Else, a cavity is formed with the back plastic layer; a higher index material may then be placed within the cavity and cured to form the segment.

Thus, this document does not provide any indication as to the molding of the so-called button or segment. In addition, this button or segment does not create an optical path within the lens. Rather, it locally changes the refractive index of the lens and changes the power for looking through the lens.

SUMMARY OF THE INVENTION

Consequently, in one embodiment, the invention provides a process for moulding a lens having at least one insert defining an optical path within the lens, comprising:

bonding the insert to an overmould;

moulding a polymer in a mould formed on one of its faces by the said overmould.

In one embodiment, the overmould is organic. It is then particularly advantageous for the finished lens to comprise the overmould.

After the moulding step, a step of machining the overmould may also be provided. The finished lens may then comprise part of the overmould.

It is possible to choose a mineral insert.

It is also possible to use a mineral overmould. In this case, the process advantageously includes, after the moulding step, a step of demoulding the lens, which step comprises separating the overmould from the moulded polymer. It is then advantageous to provide, after the demoulding step, a step of machining the surface of the lens. This step may involve the removal of part of the insert.

The invention also provides a lens obtained according to such a process.

The invention makes it possible to provide inserts in a moulded ophthalmic lens, while ensuring that these inserts are properly positioned in the lens.

BRIEF DESCRIPTION OF THE DRAWINGS

Further features and advantages of the invention will become apparent on reading the following detailed description of the embodiments of the invention, these being given solely by way of example and with reference to the drawings where:

FIG. 1 is a schematic diagram of a lens having inserts;

FIG. 2 is a schematic diagram of a lens manufactured according to one method embodying the invention;

FIGS. 3 to 8 show steps of a process for manufacturing lenses according to one method embodying the invention; and FIGS. 9 and 10 show steps of a process for manufacturing lenses according to a second method embodying the invention.

DETAILED DESCRIPTION OF THE INVENTION

FIG. 1 is a schematic diagram showing an ophthalmic spectacles lens having inserts, of the kind proposed in FIG. 7 of patent U.S. Pat. No. 5,886,822. The ophthalmic lens 2 is an optical system formed from a material 4 in which a projection insert 6 is placed. The insert 6 sends to the user's eye 10 the light coming from a source 12, through a focusing lens 8. The light coming from the source 12 is injected into the thickness of the ophthalmic lens through a focusing lens 14 placed on the periphery of the ophthalmic lens. The light coming from the external environment passes through the insert 6 and the focusing lens 8, and thus reaches the user's eye. The latter may therefore see both the image from the source 12 and the external environment. FIG. 1 is only one example of an insert that can be placed in the lens. Other configuration examples of lenses with inserts have been proposed in U.S. Pat. No. 5,886,822; for example, the source may be placed on the same side of the lens as the user's eye and this image may be injected into the lens by means of an insert of the same type as the insert 6.

More generally, inserts other than those of that document may be provided. In particular, the inserts may comprise mirrored prisms, semi-transparent polarizing beam splitter cubes, quarterwave plates or Mangin mirrors. These inserts may be formed by thin-film deposition constituting optical treatments on mineral or organic elements. Diffractive lenses or holographic components may especially be mentioned.

More generally, the inserts may be classified into three "chemical" families, depending on the nature of the material used for depositing the optically active films. The first family comprises mineral inserts. They are formed from a material of the optical-grade glass matrix type; as an example, mention may be made of soda-lime glass containing 15% sodium oxide, which is "window glass", lead or crystal glass, borosilicate or Pyrex glass, or else quartz. The second family comprises thermoset inserts, and especially the polymers used to manufacture organic glasses. These polymers are detailed below during the discussion of the polymer used for moulding the lens. The third family comprises thermoplastics, such as polycarbonate and PMMA.

It is possible to provide, as in U.S. Pat. No. 5,886,822, a single insert or two inserts; more generally, the number of inserts has no impact on the examples proposed. The shape of the inserts is also of no consequence.

The invention relates to the provision of lenses having such inserts. They may be lenses intended for projecting an image, as in U.S. Pat. No. 5,886,822; other types of inserts and other uses of the lenses may also be envisaged. The inserts define an optical path, for combining an image with the image of the environment; they may also define an optical path for projecting an image, even in case the surrounding optical system—the spectacles lens—is not used for looking at the environment but simply serves as a support of the inserts. The inserts thus define an optical path for an image different from the one of the environment. This optical path is defined within the lens—but of course also out of the lens for reaching the eye of the user.

To provide lenses having inserts, the invention proposes to bond the inserts to a half-mould and then to mould the lens around the inserts bonded to the half-mould. In a first embodiment, it is proposed to bond the inserts to a half-mould made of organic material. In a second embodiment, it is proposed to use inserts having a thickness greater than the final thickness required for the lens including the inserts.

FIG. 2 is a schematic diagram of a lens manufactured according to one embodiment of the invention; this is a lens made of organic material, for example materials based on a (meth)allyl polymer, materials based on a (meth)acrylic polymer, materials based on a thio(meth)acrylic polymer, materials based on a poly(thio)urethane and materials based on episulphides.

A first family of materials consists of those obtained from polymerizable or curable compositions comprising (meth) allyl monomers or prepolymers derived from bisphenol A, in particular the bis(allyl carbonate) of bisphenol A. The latter can be used by itself or as a mixture with other copolymerizable monomers, in particular with diethylene glycol bis (allyl carbonate).

More particularly recommended materials, together with processes for obtaining them, are given in EP-A-224 123 and FR-A-2 703 056.

A second family of materials consists of those obtained from polymerizable or curable compositions comprising (meth)acrylic monomers or prepolymers derived from bisphenol A, in particular the dimethacrylate of bisphenol A or the dimethacrylate of poly(ethoxy)bisphenol A. Such materials are described inter alia in EP-A-605 293.

A third family of materials consists of thio(meth)acrylic polymers. These are obtained from the thio(meth)acrylate monomers described in patents EP-A-745 620 and EP-A-745 621.

A fourth family of materials consists of polyurethanes or polythiourethanes. The latter are obtained from compositions containing at least one polythiol compound and at least one polyisocyanate compound, these resulting in a polythiourethane material. Such materials and the methods for obtaining them are described more particularly in U.S. Pat. No. 4,689,387 and U.S. Pat. No. 4,775,733. One particularly recommended polythiourethane substrate is obtained by polymerization of compositions based on xylylene diisocyanate and pentaerythritol tetrakis(mercapto-propionate).

A fifth family of materials consists of those obtained by polymerizing episulphides, more particularly diepisulphides, for example bis(2,3-epithiopropyl)disulphide.

The lens of FIG. 2 is intended for displaying an image, while allowing the user to see through the lens; in the example, the image comes from a source which is on the same side of the lens as the user's eye. The lens therefore has, in a matrix 15, a first triangular insert 16 located near the periphery of the lens. This insert is intended to send the light received from the source (not shown in the figure) along an optical path contained in the thickness of the lens. The insert therefore has a reflecting face, which may for example be produced by depositing an aluminium film on the insert. The inserts of the lens also include a second insert 28 intended to send the light received from the first insert to the user's eye; in the example in FIG. 2, this second insert is formed from a polarizing beam splitter cube 28, a quarterwave plate 20 and a Mangin mirror 22. The polarizing beam splitter cube may be formed by joining an untreated prism 24 to a prism 26 on which a polarizing beam splitter film has been deposited. The cube thus formed may be joined to the quarterwave plate by bonding; the assembly thus formed is joined to the Mangin mirror by bonding. The inserts of FIG. 2 constitute merely one example in which two different inserts are provided in the lens. Once again, it is obvious that the number of inserts and their nature may vary with respect to this example.

The operation of the lens of FIG. 2 is the following. The light coming from the image source enters the lens, as shown symbolically by the broken line 30, is reflected by the first insert 16, passes through the prism 24, the prism 26 and the quarterwave plate 20 and is reflected by the Mangin mirror 22. The light reflected by the Mangin mirror again passes through the quarterwave plate and, because of the optical path travelled, is reflected by the prism 26 towards the user's eye. The light coming from the environment passes through the prism 24 and the prism 26 and strikes the user's eye.

FIGS. 3 to 8 shows steps of a process for manufacturing the lens of FIG. 2, according to one embodiment of the invention. FIG. 3 shows a first step of preparative positioning. The second insert 28 is assembled and the two inserts 16 and 28 are placed, in the required relative position, in a positioning tool 32. This tool is of any type and simply ensures, during the steps in FIGS. 3 and 4, that the inserts are held in the correct relative position. More generally, the positioning tool 32 may pick up and position, separately, the various elements making up the inserts. It could then have several arms or several means for positioning the inserts. The inserts may also be preassembled and be in the form of a single block. In this case, the positioning tool 32 may be simpler.

The surfaces of the inserts directed towards the user in the finished lens are coated with adhesive 34. Various adhesive coating techniques may be used, for instance immersion, spraying, screen printing, extrusion and application using a syringe, pad, brush or spatula. Adhesive coating using a syringe allows the volume of adhesive to be precisely controlled by selecting appropriate values of time and pressure. The inserts coated with adhesive and held by the positioning tool are applied against a sheet 36 of organic material, in the direction indicated by the arrow 38. Hereafter, this sheet is termed "overmould" because of its function in the process, which may be seen in FIGS. 6 and 7. In the example, the sheet is flat, with parallel faces, but it could have any shape provided that it holds the inserts in position and serves as an overmould for curing the rest of the lens. The benefit of a sheet made of organic material will become apparent hereafter.

FIG. 4 shows the end of bonding the inserts to the overmould. In the example in the figure, the inserts are bonded using a curable adhesive. The figure therefore shows the step of curing the adhesive using ultraviolet light 40. Adhesives of the epoxy, acrylic, cyanurate or urethane families may especially be used. They may be hot-melts, of the solvent type or of the reactive adhesive type. Adhesives exist which are optimized for plastic-to-plastic or glass-to-plastic bonding, as in the first embodiment, or for plastic-to-glass or glass-to-glass bonding as in the second embodiment described below. The precise choice of the adhesive depends therefore on the application. It is clear that, depending on the nature of the adhesive, an irradiation step as shown in FIG. 4 may be unnecessary and could be replaced with steps of heating or the like.

FIG. 5 shows that the positioning tool 32 has been released. The method of releasing the positioning tool depends on the nature of this tool, and will not be discussed here. In this step, the inserts 16 and 28, bonded to the overmould 36 in the position required in the finished lens, are obtained.

FIG. 6 shows the formation of a mould; the mould uses as half-moulds, on the one hand, the overmould 36 provided with the inserts, and, on the other hand, a half-mould 42 of any type. In the example in FIG. 6, the second half-mould 42 is also formed from a sheet made of an organic material. The benefit of providing an organic sheet will be apparent hereafter. Not shown in the figure are the lateral mould-closing elements for which any type of solution known per se may be used. The figure furthermore shows that the mould is filled with a polymer 44, with if necessary the corresponding catalyst.

FIG. 7 shows the curing of the polymer inside the mould around the inserts. Conventional thermal curing, or more generally any type of curing suited to the polymer chosen, may be carried out.

FIG. 8 shows a step of surface grinding the lens. In the example shown in FIGS. 3 to 8, both faces of the lens are surfaced. This is facilitated by the fact that, as for the second half-mould 42, an organic material is used for the overmould 36. If, as FIG. 8 shows, part of the overmould and/or of the half-mould remains after surface grinding, it is advantageous for the material of the overmould and/or of the half-mould to be the same material as the polymer 44 forming the lens. Thus, any index variation through the thickness of the lens is avoided. Of course, it is also possible to use different materials from the polymer 44 for the overmould and/or the second half-mould. This may especially be the case in order to improve the guiding of the light through the thickness of the lens, between the insert 16 and the insert 28. This may also be the case if it is useful to provide surface(s) of a different kind for the lens.

In the example, both faces of the lens are machined. It is clear that a conventional half-mould may also be used for the second half-mould 42; in this case, the half-mould may be removed after curing. It is apparent that this has no impact on the position of the inserts in the lens obtained according to the process. The overmould 42 or 36 could also be retained; this applies especially if the total thickness of the lens is not an important criterion. The overmould 36 could also be machined to adapt the lens to an ophthalmic prescription; in this case, the use of an overmould makes it possible to provide a lens having a correction, without any risk of damaging the inserts by machining the faces of the lens.

The example that has just been described is particularly suitable for mineral inserts. In fact, after assembling them on the overmould, the inserts are no longer handled, and in particular are not machined. It is clear that the example also applies to organic inserts.

FIGS. 9 and 10 shows steps of a second embodiment of the invention. The second differs from the first in that the overmould is not machined or retained after curing, but is removed before the surface of the lens is possibly machined. In this way, the machining of the surface of the lens may be provided with removal of part of the insert or inserts. In this case, it is advantageous for the inserts to have, during the bonding step, a thickness greater than the thickness of the inserts in the completed lens.

Advantageously, a mineral overmould, that is to say a glass overmould, is used. The use of a mineral overmould allows organic or mineral inserts to be effectively bonded to the surface of the overmould.

The first five steps of the example are identical to the steps in FIGS. 3 to 7. After curing (FIG. 6), the demoulding step is carried out. During demoulding, the overmould is separated from the cured material and from the inserts. It is easy to separate the cured material 44 from the overmould 36 if the overmould is made of a mineral material. This separation is even easier if the overmould has been covered beforehand with a film limiting adhesion or if a demoulding agent has been incorporated into the curable composition resulting in the polymer. The inserts may be subjected to a preliminary surface treatment of the chemical type—application of an adhesion primer—and/or of the physical type—corona discharge, plasma or sandblasting. In the process, the nature of the other face of the mould does not matter. This other face may be metallic, as in the prior art. It may be an organic half-mould which then forms part of the lens as in the example shown in FIGS. 3 to 8, or else a half-mould made of mineral material. In the case of a second half-mould made of mineral material or of metal, the article shown in FIG. 9 is obtained. This is a lens formed from a cured material 44 in which the inserts 16 and 28 have been placed.

If necessary, a step of surface grinding the lens may be provided. This is indicated in FIG. 9 by the broken line, which shows the boundary of removal of the polymer and the inserts. It should be noted in the example that the surface grinding results in the removal of part of the inserts. It could also be limited to the removal of part of the polymer 44 and of the adhesive 34, without removal of the inserts. However, removal of part of the inserts makes it easier to provide an entrance or exit surface inducing no perturbations.

FIG. 10 shows the lens after surface grinding, in which it may be seen that the inserts have a smaller thickness than during the step of bonding to the overmould; this reduction in thickness results from the machining step.

It would also be possible to use, in the example shown in FIGS. 9 and 10, an overmould made of organic material. However, demoulding of the lens from the overmould must be allowed in this embodiment, and therefore separation from the overmould and from the assembly consisting of the inserts 16, 28 and the polymer 44 must be allowed. For this purpose, a nonstick coating may be provided on the overmould, for example one based on a fluoropolymer or silicone polymer. It is also possible to incorporate a demoulding agent in the curable composition resulting in the polymer. An internal demoulding agent for high-index polymers is described, for example, in U.S. Pat. No. 5,962,561. This coating does not prevent the inserts from being bonded to the overmould nor the subsequent debonding of the inserts during demoulding.

The various methods of implementing the invention allow one or more of the following problems to be avoided when providing ophthalmic lenses having inserts defining an optical path:

- displacement of the inserts during curing;
- debonding between the inserts and the organic matrix during shrinkage of the polymer;
- surface deformation around the inserts due to shrinkage of the polymer;
- stresses around the inserts because of the differences in mechanical and thermal properties between the polymer and the inserts.

In the example of the use of inserts for displaying an image, these four problems cause perturbations of the image displayed; the first two problems may prevent the image from being displayed at all. The last two problems may cause the optical path around the inserts to be locally modified; this modification may be troublesome for the wearer when looking through the inserts.

In both examples, the inserts are immobilized during curing because of the bonding of the inserts to the overmould, whether it is organic or mineral.

In the first example, the lack of cohesion between the inserts and the matrix during shrinkage of the polymer is avoided because of the judicious choice of the matrix of the polymer material of the lens and/or of the preliminary surface treatment that was applied to the inserts, whether of the chemical or physical type.

In the first example, the surface deformation around the inserts during shrinkage of the polymer is avoided since, on the surface, the inserts are bonded to the overmould. The latter is not cured and therefore undergoes no shrinkage. In the second example, the inserts appear on the surface of the lens, and the surface deformation problem does not arise after the surface grinding step.

If necessary, the stresses around the inserts may be further reduced by choosing optimum curing conditions and/or an optional annealing step suited to the material.

For cosmetic reasons, what should be chosen for the inserts is a material, whether organic or mineral, having a refractive index and a constringence which are as close as possible, ideally identical, to those of the cured material so as to make these inserts as invisible as possible.

It should be stressed that inserts defining an optical path within the lens should be located with an accuracy much higher than the accuracy necessary for weight units of contact lenses or than the accuracy necessary for buttons such as the one of EP-A-0 509 190. In the case of inserts defining an optical path within the lens or an optical path for an image different from the image of the environment, the additional image may simply not be projected, or may be totally unreadable.

For weighing insert in contact lenses, the exact location is of little relevance—provided the weighing insert is out of the part of the lens covering the pupilla, and provided it is on the correct side of the contact lens. For optical inserts which locally change the refractive index of the lens, an improper position of the insert will simply result in lower performances—but would never prevent the user from seeing through the contact lens or through the spectacles lens.

Of course, the present invention is not limited to the examples and embodiments described as examples. Thus, it would also be possible to provide inserts bonded to two overmoulds, the two overmoulds forming the moulding cavity of the lens. In this case, the two embodiments discussed above could be combined, by providing, on one side, an organic overmould removed by surface grinding after curing and providing, on the other side, an organic overmould. More generally, it is possible to combine the two embodiments and use in one of them elements of the other. It is also possible to add surface treatments, or other treatments, to the lens obtained after the abovementioned steps. Mention may especially be made, as surface treatments, of the deposition of an impact-resistant coating, a scratch-resistant coating, an antireflection coating, an antifouling coating, etc., one or other of these coatings possibly containing various additives, such as UV absorbers, dyes, pigments, etc.

In the foregoing description, surface grinding or machining operations were mentioned, together with the possibility of machining the overmould in order to adapt the lens to an ophthalmic correction. More generally, the process also allows a lens having a correction to be obtained. The overmoulds 36 and the half-moulds 42, when they are made of an organic material, may be machined together or separately, so as to provide a lens having a correction. The overmould and/or the half-mould may then be preserved in the completed lens and impart the correction or part of it to the lens.

In general, these overmoulds and half-moulds, whatever the material of which they are made, may, if necessary, have beforehand the correcting surface that it is desired to obtain on the lens. The process therefore makes it possible to obtain lenses with inserts without corrections, but also lenses with an insert having a correction.

What is claimed is:

1. A process for moulding a lens having at least one insert defining an optical path within the lens for an image different from that of an environment viewed through the lens, comprising:

bonding of the insert to an overmould;

moulding of a polymer in a mould formed on one of its faces from the overmould thereby forming the lens having the at least one insert defining the optical path within the lens for an image different from that of the environment viewed through the lens.

2. The process of claim 1, wherein the overmould is an organic overmould.

3. The process of claim 1, wherein the lens includes the overmould.

4. The process of claim 2, wherein the lens includes the overmould.

5. The process of claim 3, further comprising, after the moulding step, a step of machining the overmould.

6. The process of claim 1, wherein the insert is a mineral insert.

7. The process of claim 5, wherein the insert is a mineral insert.

8. The process of claim 1, wherein the overmould is a mineral overmould.

9. The process of claim 8, further comprising, after the moulding step, a step of demoulding the lens, which step comprises separating the overmould from the moulded polymer.

10. The process of claim 9, further comprising, after the demoulding step, a step of machining the surface of the lens.

11. The process of claim 10, wherein the machining step comprises removing of part of the insert.

* * * * *